US012330777B2

(12) United States Patent
Ye

(10) Patent No.: US 12,330,777 B2
(45) Date of Patent: Jun. 17, 2025

(54) ROTOR ASSEMBLY AND UNMANNED AERIAL VEHICLE HAVING THE SAME

(71) Applicant: SZ DJI TECHNOLOGY CO., LTD., Shenzhen (CN)

(72) Inventor: Fangming Ye, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/732,012

(22) Filed: Jun. 3, 2024

(65) Prior Publication Data

US 2024/0317393 A1  Sep. 26, 2024

Related U.S. Application Data

(63) Continuation of application No. 17/236,423, filed on Apr. 21, 2021, now Pat. No. 11,999,470, which is a
(Continued)

(51) Int. Cl.
*B64C 27/32* (2006.01)
*B64C 11/00* (2006.01)
(Continued)

(52) U.S. Cl.
CPC .............. *B64C 27/32* (2013.01); *B64C 11/00* (2013.01); *B64C 11/10* (2013.01); *B64C 27/006* (2013.01);
(Continued)

(58) Field of Classification Search
CPC ......... B64C 27/32; B64C 11/00; B64C 11/10; B64C 27/006; B64C 27/08; B64C 39/024;
(Continued)

(56) References Cited

U.S. PATENT DOCUMENTS 11,155,335 B2 * 10/2021 Tao ..................... B64U 30/20
11,364,998 B2 *  6/2022 Yoon ................... B64U 30/20
(Continued)

FOREIGN PATENT DOCUMENTS

CN      103372322 A    10/2013
CN      103921937 A     7/2014
(Continued)

OTHER PUBLICATIONS

The World Intellectual Property Organization (WIPO) International Search Report for PCT/CN2015/090771 Jun. 30, 2016 5 Pages (including translation).

*Primary Examiner* — Valentina Xavier
(74) *Attorney, Agent, or Firm* — ANOVA LAW GROUP, PLLC

(57) ABSTRACT

A rotor assembly includes a propeller, a motor, and a connection assembly. The motor includes a stator and a rotator rotatable with respect to the stator, and is configured to drive the propeller to rotate through the rotator. The connection assembly is arranged between the propeller and the motor, and includes a locking member and an elastic member. The elastic member is configured to provide a force onto the locking member in response to the propeller being locked to the motor by the locking member, to maintain a locking state of the locking member.

20 Claims, 8 Drawing Sheets

Related U.S. Application Data continuation of application No. 15/934,239, filed on Mar. 23, 2018, now Pat. No. 10,988,242, which is a continuation of application No. PCT/CN2015/090771, filed on Sep. 25, 2015.

(51) Int. Cl.

| | | |
|---|---|---|
| *B64C 11/10* | (2006.01) | |
| *B64C 27/00* | (2006.01) | |
| *B64C 27/08* | (2023.01) | |
| *B64C 39/02* | (2023.01) | |
| *B64D 35/00* | (2006.01) | |
| *B64D 35/02* | (2006.01) | |
| *B64U 30/29* | (2023.01) | |
| *B64U 10/10* | (2023.01) | |
| *B64U 10/14* | (2023.01) | |
| *B64U 30/20* | (2023.01) | |
| *B64U 101/30* | (2023.01) | |

(52) U.S. Cl.
CPC ............ *B64C 27/08* (2013.01); *B64C 39/024* (2013.01); *B64D 35/00* (2013.01); *B64D 35/02* (2013.01); *B64U 30/29* (2023.01); *B64U 10/10* (2023.01); *B64U 10/14* (2023.01); *B64U 30/20* (2023.01); *B64U 2101/30* (2023.01)

(58) Field of Classification Search
CPC ........ B64D 35/00; B64D 35/02; B64U 10/10; B64U 30/20
See application file for complete search history.

(56) References Cited

U.S. PATENT DOCUMENTS

| | | | |
|---|---|---|---|
| 11,420,734 B2 * | 8/2022 | Zhang | ............... B64C 11/10 |
| 2015/0129711 A1 * | 5/2015 | Caubel | ............... B64U 50/19 |
| | | | 244/17.23 |
| 2019/0118941 A1 | 4/2019 | Iskrev et al. | |
| 2019/0193835 A1 | 6/2019 | Sandberg | |
| 2020/0180756 A1 | 6/2020 | Kapeter | |

FOREIGN PATENT DOCUMENTS

| | | |
|---|---|---|
| CN | 204279899 U | 4/2015 |
| CN | 104743104 A | 7/2015 |
| CN | 204433073 U | 7/2015 |
| CN | 104853988 A | 8/2015 |
| JP | 2015110413 A | 6/2015 |
| WO | 2014141154 A1 | 9/2014 |

* cited by examiner

ROTOR ASSEMBLY AND UNMANNED AERIAL VEHICLE HAVING THE SAME

CROSS-REFERENCE TO RELATED APPLICATIONS

This application is a continuation of application Ser. No. 17/236,423, filed on Apr. 21, 2021, which is a continuation of application Ser. No. 15/934,239, filed on Mar. 23, 2018, now U.S. Pat. No. 10,988,242, which is a continuation of International Application No. PCT/CN2015/090771, filed on Sep. 25, 2015, the entire contents of all of which are incorporated herein by reference.

TECHNICAL FIELD

The present disclosure relates to unmanned aerial vehicles (UAVs), and more particularly to a rotor assembly and an UAV having the rotor assembly.

BACKGROUND OF THE DISCLOSURE

A rotor assembly is a propulsion component of a rotor-wing unmanned aerial vehicle (UAV). A stringent requirement is imposed to a quality of the rotor assembly. For example, the rotor assembly has to provide an appropriate propulsion at a high rotating speed while ensuring a safety to prevent any damage to the UAV and/or surrounding objects.

A rotor assembly can comprise a motor and a propeller fixed to a rotating shaft of the motor. A rotation of the rotating shaft of the motor can drive a rotation of the propeller to produce a propulsion. The existing propeller can be fixed to a motor by a complicated connection, therefore a quick release of the propeller from the motor is not effected, resulting in a difficulty in assembling/disassembling and an inconvenience in use. The propeller in existing detachable rotor assembly can be subject to a severe wear and tear, causing a damage to the propeller. In some instances, the propeller can be loosened from the rotor assembly in a long-term use, leading to safety risks.

SUMMARY OF THE DISCLOSURE

There is a need for a rotor assembly which simplifies an installation and ensures an operation safety, and an unmanned aerial vehicle (UAV) having the rotor assembly.

An aspect of the disclosure provides a rotor assembly comprising a motor, a propeller and a connection assembly coupling the propeller to the motor, the motor comprising a stator and a rotator rotatable with respect to the stator. The connection assembly can comprise a locking member provided between the propeller and the rotator, the locking member being rotatable with respect to the rotator and the propeller. A rotation of the locking member relative to the propeller can lock the propeller to the motor.

In some embodiments, the locking member can comprise a latch. A first locking block matching with the latch is provided at the propeller. The latch can be coupled to the first locking block when the propeller is locked.

In some embodiments, a second locking block engaging with the first locking block can be formed at an end of the latch where the latch can be coupled to the first locking block. The propeller can be locked by engaging the second locking block with the first locking block.

In some embodiments, a fitting surface of the first locking block and the second locking block can be an inclined surface which can be inclined at a predetermined angle with respect to an axis of rotation of the propeller. An end of the fitting surface distal from the axis of rotation of the propeller is distal from the motor.

In some embodiments, a first alignment marker can be provided on a side of the propeller distal from the motor. A second alignment marker can be provided on the latch. The first alignment marker and the second alignment marker can be aligned along a radial direction of the propeller when the propeller is locked by the locking member.

In some embodiments, the propeller can comprise a seat and a blade fixed to the seat. The first locking block can be provided on the seat.

In some embodiments, the blade can comprise a first blade and a second blade which can be fixed to two sides of the seat along a radial direction of the seat. The first locking block can be positioned between the first blade and the second blade and can be in proximity to the first blade. A gap allowing the latch to pass through can be formed between the first locking block and the second blade.

In some embodiments, the rotator can comprise a rotating shaft and a connecting portion fixedly connected to the rotating shaft. The locking member can be rotatably provided between the propeller and the connecting portion.

In some embodiments, the connection assembly can comprise a restrainer. The restrainer can be coupled to the propeller and rotatably restrain the locking member on the connecting portion.

In some embodiments, the restrainer can comprise a restraining flange and a boss connected to the restraining flange. The restraining flange can be fixed to the connecting portion and restrain the locking member to rotate along an axis of rotation of the propeller. The boss can be coupled to the propeller and restrain a relative rotation between the propeller and the restrainer about the axis of rotation of the propeller.

In some embodiments, an extending direction of the boss can be substantially perpendicular to an extending direction of the restraining flange.

In some embodiments, the connection assembly can comprise an elastic member provided between the locking member and the motor. The elastic member can be fixed to the rotator and elastically abut against the locking member.

In some embodiments, the locking member can comprise a connecting portion. A bulge facing the motor can be formed on the connecting portion. An elastic protrusion protruding toward the propeller can be formed on the elastic member, the elastic protrusion elastically abutting against the bulge. The bulge can be shifted between two lateral sides of the elastic protrusion along the elastic protrusion when the locking member rotates with respect to the propeller and the rotator.

In some embodiments, both sides of the bulge and both sides of the elastic protrusion can be smoothly curved surfaces.

In some embodiments, the connecting portion can be provided with a substantially annular shape. An abutting piece can protrude from an inner surface of the connecting portion. The bulge can be formed on the abutting piece.

In some embodiments, the elastic member can comprise a connecting portion and an elastic tab. The connecting portion can be fixed to the rotator. The elastic tab can protrude toward the locking member with respect to a surface of the connecting portion. The elastic protrusion can be formed by bending the elastic tab.

Another aspect of the disclosure provides an unmanned aerial vehicle (UAV) comprising at least one rotor assembly, the rotor assembly comprising a motor, a propeller and a connection assembly coupling the propeller to the motor, the motor comprising a stator and a rotor rotatable with respect to the stator. The connection assembly can comprise a locking member provided between the propeller and the rotor, the locking member being rotatable with respect to the rotator and the propeller. A rotation of the locking member relative to the propeller can lock the propeller to the motor.

In some embodiments, the locking member can comprise a latch. A first locking block matching with the latch can be provided at the propeller. The latch can be coupled to the first locking block when the propeller is locked.

In some embodiments, a second locking block engaging with the first locking block can be formed at an end of the latch where the latch can be coupled to the first locking block. The propeller can be locked by engaging the second locking block with the first locking block.

In some embodiments, a fitting surface of the first locking block and the second locking block can be an inclined surface which can be inclined at a predetermined angle with respect to an axis of rotation of the propeller. An end of the fitting surface distal from the axis of rotation of the propeller can be distal from the motor.

In some embodiments, a first alignment marker can be provided on a side of the propeller distal from the motor. A second alignment marker can be provided on the latch. The first alignment marker and the second alignment marker can be aligned along a radial direction of the propeller when the propeller is locked by the locking member.

In some embodiments, the propeller can comprise a seat and a blade fixed to the seat. The first locking block can be provided on the seat.

In some embodiments, the blade can comprise a first blade and a second blade which can be fixed to two sides of the seat along a radial direction of the seat. The first locking block can be positioned between the first blade and the second blade and can be in proximity to the first blade. A gap for allowing the latch to pass through can be formed between the first locking block and the second blade.

In some embodiments, the rotor can comprise a rotating shaft and a connecting portion fixedly connected to the rotating shaft. The locking member can be rotatably provided between the propeller and the connecting portion.

In some embodiments, the connection assembly can comprise a restrainer. The restrainer can be coupled to the propeller and rotatably restrain the locking member on the connecting portion.

In some embodiments, the restrainer can comprise a restraining flange and a boss connected to the restraining flange. The restraining flange can be fixed to the connecting portion and restrain the locking member to rotate along an axis of rotation of the propeller. The boss can be coupled to the propeller and restrain a relative rotation between the propeller and the restrainer about the axis of rotation of the propeller.

In some embodiments, an extending direction of the boss can be substantially perpendicular to an extending direction of the restraining flange.

In some embodiments, the connection assembly can comprise an elastic member provided between the locking member and the motor. The elastic member can be fixed to the rotor and elastically abut against the locking member.

In some embodiments, the locking member can comprise a connecting portion. A bulge facing the motor can be formed on the connecting portion. An elastic protrusion protruding toward the propeller can be formed on the elastic member, the elastic protrusion elastically abutting against the bulge. The bulge can be shifted between two lateral sides of the elastic protrusion along the elastic protrusion when the locking member rotates with respect to the propeller and the rotator.

In some embodiments, both sides of the bulge and both sides of the elastic protrusion can be smoothly curved surfaces.

In some embodiments, the connecting portion can be provided with a substantially annular shape. An abutting piece can protrude from an inner surface of the connecting portion. The bulge can be formed on the abutting piece.

In some embodiments, the elastic member can comprise a connecting portion and an elastic tab. The connecting portion can be fixed to the rotator. The elastic tab can protrude toward the locking member with respect to a surface of the connecting portion. The elastic protrusion can be formed by bending the elastic tab.

In some embodiments, the UAV can further comprise a body and an arm connected to the body. The rotor assembly can be provided around the body by the arm.

In some embodiments, the arm can comprise a main arm and a branch arm. One end of the main arm can be connected to the body, and the other end of the main arm can be connected to the branch arm. The rotor assembly can be positioned at an end of the branch arm.

In some embodiments, four rotor assemblies can be provided which can be positioned in a rectangular region surrounding the body. Adjacent rotor assemblies can rotate in different rotating directions in operation.

Another aspect of the disclosure provides an unmanned aerial vehicle (UAV) comprising at least one rotor assembly, the rotor assembly comprising a motor, a propeller and a connection assembly coupling the propeller to the motor, the motor comprising a stator and a rotor rotatable with respect to the stator. The connection assembly can comprise a locking member provided between the propeller and the rotator, the locking member being rotatable with respect to the rotator and the propeller. A rotation of the locking member relative to the propeller can lock the propeller to the motor. A rotating direction of the locking member relative to the propeller in locking the propeller can be identical to a rotating direction of the propeller in operation.

In some embodiments, the locking member can comprise a latch. A first locking block matching with the latch can be provided at the propeller. The latch can be coupled to the first locking block when the propeller is locked.

In some embodiments, a second locking block engaging with the first locking block can be formed at an end of the latch where the latch can be coupled to the first locking block. The propeller can be locked by engaging the second locking block with the first locking block.

In some embodiments, a fitting surface of the first locking block and the second locking block can be an inclined surface which can be inclined at a predetermined angle with respect to an axis of rotation of the propeller. An end of the fitting surface distal from the axis of rotation of the propeller can be distal from the motor.

In some embodiments, a first alignment marker can be provided on a side of the propeller distal from the motor. A second alignment marker can be provided on the latch. The first alignment marker and the second alignment marker can be aligned along a radial direction of the propeller when the propeller is locked by the locking member.

In some embodiments, the propeller can comprise a seat and a blade fixed to the seat. The first locking block can be provided on the seat.

In some embodiments, the blade can comprise a first blade and a second blade which can be fixed to two sides of the seat along a radial direction of the seat. The first locking block can be positioned between the first blade and the second blade and can be in proximity to the first blade. A gap for allowing the latch to pass through can be formed between the first locking block and the second blade.

In some embodiments, the rotator can comprise a rotating shaft and a connecting portion fixedly connected to the rotating shaft. The locking member can be rotatably provided between the propeller and the connecting portion.

In some embodiments, the connection assembly can comprise a restrainer. The restrainer can be coupled to the propeller and rotatably restrain the locking member on the connecting portion.

In some embodiments, the restrainer can comprise a restraining flange and a boss connected to the restraining flange. The restraining flange can be fixed to the connecting portion and restrain the locking member to rotate along an axis of rotation of the propeller. The boss can be coupled to the propeller and restrain a relative rotation between the propeller and the restrainer about the axis of rotation of the propeller.

In some embodiments, an extending direction of the boss can be substantially perpendicular to an extending direction of the restraining flange.

In some embodiments, the connection assembly can comprise an elastic member provided between the locking member and the motor. The elastic member can be fixed to the rotator and elastically abut against the locking member.

In some embodiments, the locking member can comprise a connecting portion. A bulge facing the motor can be formed on the connecting portion. An elastic protrusion protruding toward the propeller can be formed on the elastic member, the elastic protrusion elastically abutting against the bulge. The bulge can be shifted between two lateral sides of the elastic protrusion along the elastic protrusion when the locking member rotates with respect to the propeller and the rotator.

In some embodiments, both sides of the bulge and both sides of the elastic protrusion can be smoothly curved surfaces.

In some embodiments, the connecting portion can be provided with a substantially annular shape. An abutting piece can protrude from an inner surface of the connecting portion. The bulge can be formed on the abutting piece.

In some embodiments, the elastic member can comprise a connecting portion and an elastic tab. The connecting portion can be fixed to the rotator. The elastic tab can protrude toward the locking member with respect to a surface of the connecting portion. The elastic protrusion can be formed by bending the elastic tab.

In some embodiments, the UAV can further comprise a body and an arm connected to the body. The rotor assembly can be provided around the body by the arm.

In some embodiments, the arm can comprise a main arm and a branch arm. One end of the main arm can be connected to the body, and the other end of the main arm can be connected to the branch arm. The rotor assembly can be positioned at an end of the branch arm.

In some embodiments, four rotor assemblies can be provided which can be positioned in a rectangular region surrounding the body. Adjacent rotor assemblies can rotate in different rotating directions in operation.

As compared with the prior art, in the rotor assembly as discussed herein above and a UAV having the rotor assembly, the propeller can be locked by rotating the locking member with respect to the rotator and the propeller. A mechanism of rotating the propeller can be separate from a mechanism of locking the propeller. Therefore, a torque generated in locking the propeller by the locking member is not transmitted to the propeller, such that a wear and tear of the propeller can be reduced and a safety in using the rotor assembly can be ensured. In addition, a locking and unlocking of the propeller is simple and convenient.

LIST OF REFERENCE NUMERALS

TABLE 1

| | |
|---|---|
| Unmanned aerial vehicle (UAV) | 100 |
| Body | 10 |
| Casing | 11 |
| Receiving space | 101 |
| Arm | 20 |
| Main arm | 21 |
| Branch arm | 22 |
| Rotor assembly | 30 |
| Motor | 31 |
| Stator | 311 |
| Rotator | 312 |
| Rotating shaft | 312a |
| Connecting portion | 312b |
| Connecting surface | 312c |
| Side face | 312d |
| Connecting hole | 312e |
| Propeller | 32 |
| Seat | 321 |
| First alignment marker | 321a |
| First locking block | 321b |
| First fitting surface | 321c |
| Mounting hole | 321d |
| Blade | 322 |
| Connection assembly | 33 |
| Restrainer | 331 |
| Restraining flange | 331a |
| Boss | 331b |
| Through-hole | 331c |
| Locking member | 332 |
| Latch | 332a |
| Connecting portion | 332b |
| Second locking block | 332c |
| Seconding fitting surface | 332d |
| Second alignment marker | 332e |
| Abutting piece | 332f |
| Bulge | 332g |
| Elastic member | 333 |
| Connecting portion | 333a |
| Elastic tab | 333b |
| Shaft hole | 333c |

TABLE 1-continued

| | |
|---|---|
| Through-hole | 333d |
| Protrusion | 333e |
| Imaging device | 200 |
| Gimbal | 300 |

Illustrative embodiments of the disclosure will be described in more detail with reference to the drawings.

DETAILED DESCRIPTION OF THE DISCLOSURE

Figure 1:
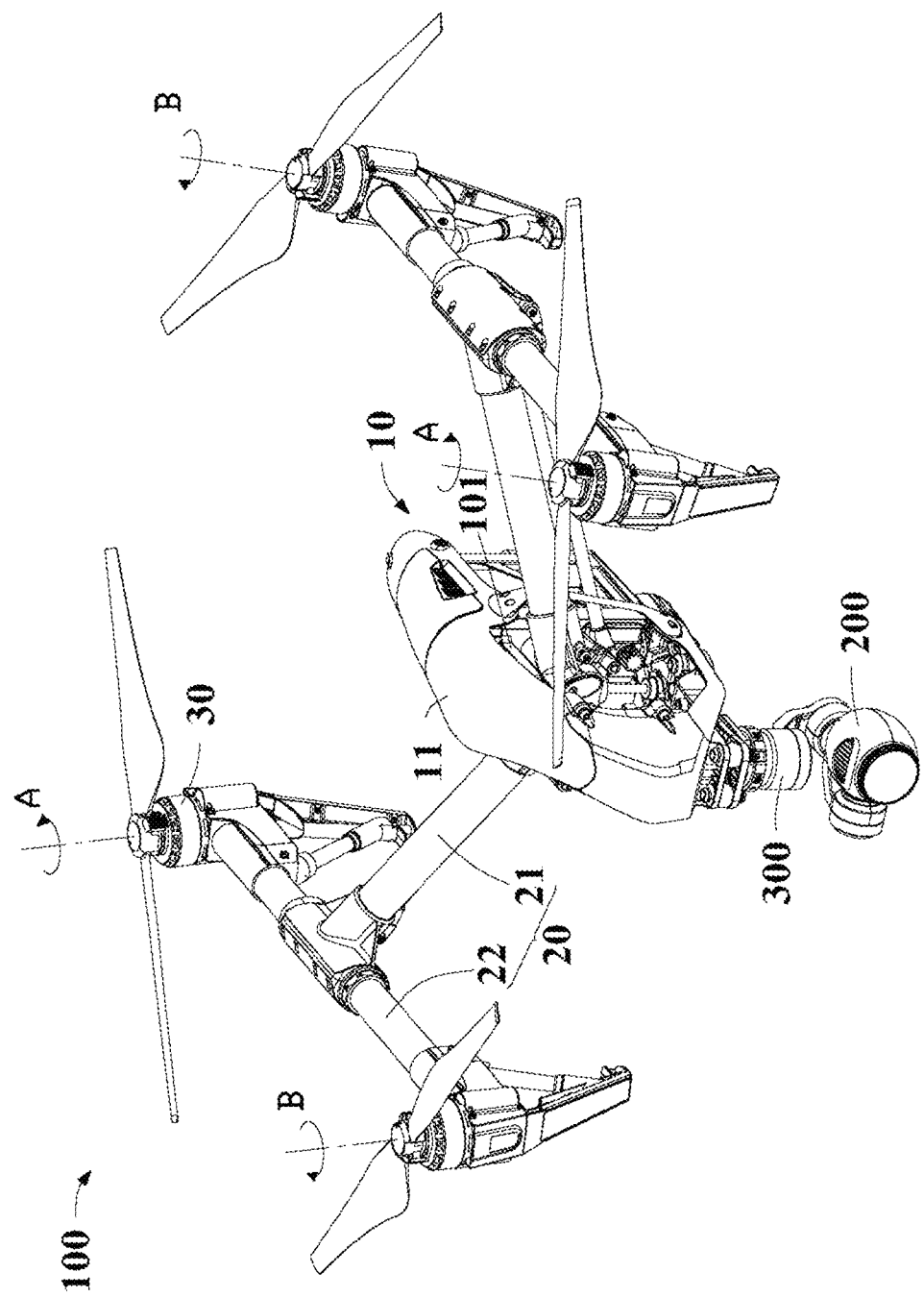
FIG. 1 shows an unmanned aerial vehicle (UAV) in accordance with embodiments of the disclosure.

Referring to FIG. 1, an unmanned aerial vehicle (UAV) 100 in accordance with embodiments of the disclosure can be a rotor-wing UAV. The UAV 100 can be capable of flying or hovering in the air to perform tasks including flying, tracking, surveillance, exploration, search and rescue, seeding, pesticide spraying, fire extinguishing and aerial photography. The UAV 100 can carry a functional module such as a sensor, an imaging device or a pesticide tank for a specific task. In some embodiments, an imaging device 200 can be carried onboard the UAV 100, such that the UAV 100 can perform an aerial photography. The imaging device 200 can be connected to the UAV 100 via a gimbal 300. The gimbal 300 can adjust an imaging direction and/or a pitch angle of the imaging device 200 and provide a damping to the imaging device 200.

The UAV 100 in accordance with embodiments of the disclosure can comprise a body 10, an arm 20 and a rotor assembly 30. The arm 20 can be connected to the body 10. The rotor assembly 30 can be provided around the body 10 by the arm 20. In some embodiments, the UAV 100 can be a four-rotor UAV having four rotor assembly 30. The four rotor assemblies 30 can be provided in a rectangular region surrounding the body 10. Each of the rotor assemblies 30 can be positioned at a vertex of the rectangle. According to the theory of aerodynamics, the adjacent rotor assemblies 30 can rotate in different rotating directions in operation while the opposite rotor assemblies 30 can rotate in the same rotating direction, such that a turbulence generated from a rotation rotor assemblies 30 can be avoided. In some embodiments, the first two rotor assemblies 30, which are oppositely positioned with respect to each other, can rotate in a counterclockwise direction (direction A) while the second two rotor assemblies 30, which are oppositely positioned with respect to each other, can rotate in a clockwise direction (direction B).

It will be appreciated that, the number of the rotor assemblies 30 can vary in different circumstances. For example, the number of the rotor assemblies 30 can be two, three, six, eight or sixteen. Optionally, only one rotor assembly 30 can be provided.

The body 10 can carry components of the UAV 100. For instance, various components including a sensor, a circuit board, a processor, a communication module and a battery can be carried on or within the body 10. In some embodiments, the body 10 can comprise a casing 11, an interior of which can form a receiving space 101 for receiving the various components. The casing 11 can be streamlined to reduce an air resistance during a flight of the UAV. Alternatively, the casing 11 can be provided in other shapes such as a polygonal shape, a circular shape or an oval shape. It will be appreciated that, the casing 11 can be omitted, and the body 10 can be constructed by frames.

The arm 20 can support the rotor assemblies 30 and position the rotor assemblies 30 around the body 10 in a predetermined pattern. In some embodiments, two arm 20 can be provided, each of which supports two rotor assemblies 30. Each of the arms 20 can comprise a main arm 21 and a branch arm 22. One end of the main arm 21 can be connected to the body 10, and the other end can be connected to the branch arm 22 to form a T-shaped connection with the branch arm 22. The two rotor assemblies 30 corresponding to each of the arms 20 can be provided at two ends of the branch arm 22.

Alternatively, the number of the arms 20 can be identical to the number of the rotor assemblies 30. For instance, each one arm 20 can support one rotor assembly 30. In this case, the branch arm 22 can be omitted, and the rotor assembly 30 can be directly disposed at an end of the main arm 21.

Alternatively, the arms 20 can be omitted. In this case, the rotor assemblies 30 can be directed disposed on the body 10.

Alternatively, the arm 20 can be a supporting arm extending from the body 10. The supporting arm can extend from a circumference of the body 10 and can be fixed to or integrally formed with the body 10. The number of the supporting arms can be identical to the number of rotor assemblies 30. For example, each one supporting arm can support one rotor assembly 30.

Figure 2:
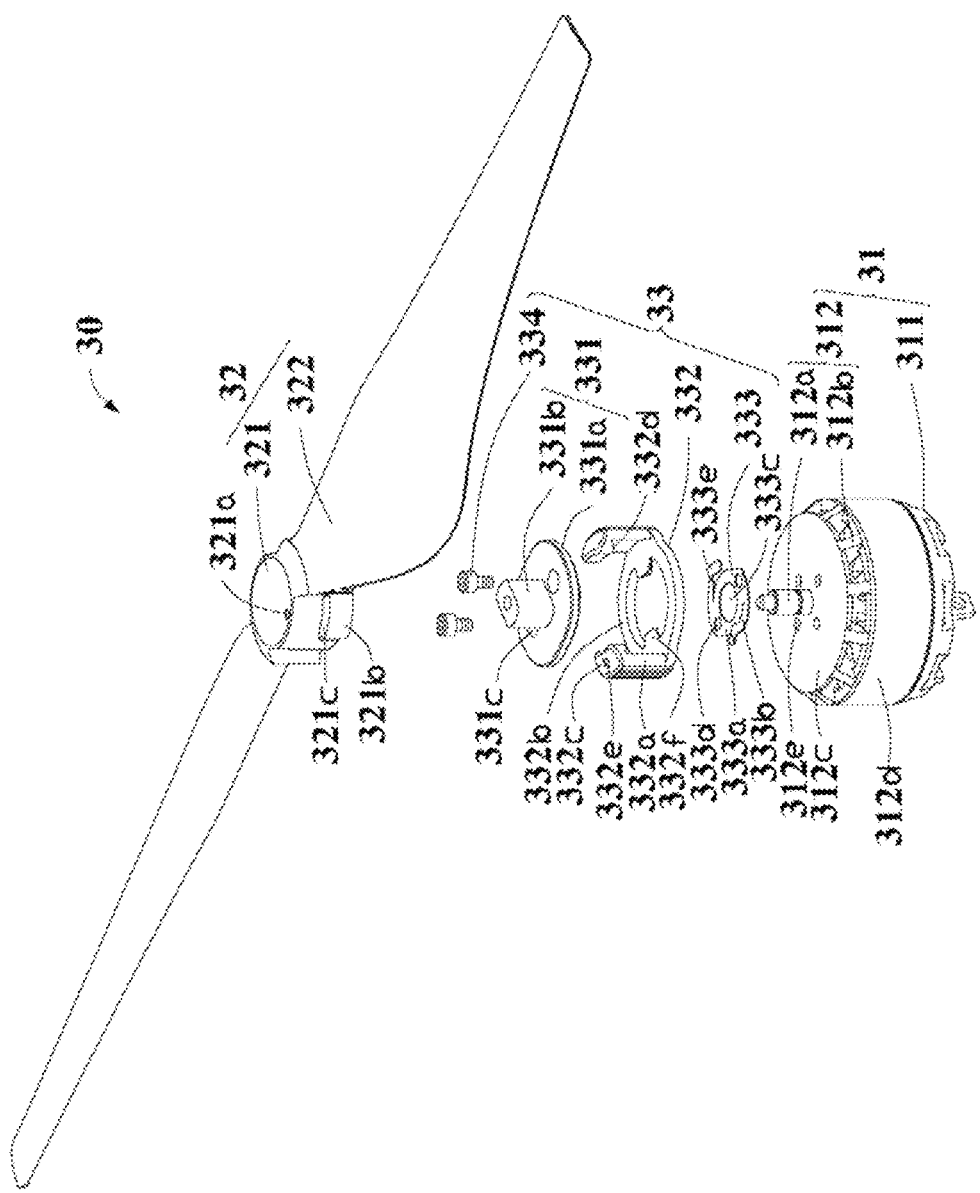
FIG. 2 is an exploded view showing a rotor assembly of the UAV of FIG. 1 which rotates in one rotating direction.

FIG. 2 is an exploded view showing a rotor assembly 30 of the UAV 100 which rotates in a counterclockwise rotating direction. The rotor assembly 30 can comprise a motor 31, a propeller 32 and a connection assembly 33. The propeller 32 can be detachably connected to the motor 31 via the connection assembly 33.

The motor 31 can comprise a stator 311 and a rotator 312 rotatable relative to the stator 311. In some instances, the rotator 312 can be fixedly connected to the arm 20. The rotator 312 can comprise a rotating shaft 312a and a connecting portion 312b fixedly connected to the rotating shaft 312a. A central axis of the rotating shaft 312a can coincide with an axis of rotation of the rotator 312. The connecting portion 312b can be positioned around a circumference of the rotating shaft 312a. The connecting portion 312b can comprise a connecting surface 312c facing the propeller 32 and a side face 312d provided at a circumference of the connecting surface 312c. The rotating shaft 312a can be fixedly connected to a center of the connecting surface 312c. A plurality of connecting holes 312e can be provided on the connecting surface 312c. In some embodiments, the connecting hole 312e can be a threaded hole, and four connecting holes 312e can be provided. It will be appreciated that, the number of the connecting holes 312e can vary in different circumstances. For example, two, three, five or six connecting holes 312e can be provided.

The rotating shaft 312a can protrude toward the propeller 32 from the connecting surface 312c by a predetermined length. In some embodiments, the rotating shaft 312a can comprise a plurality of parts having different diameters.

In some embodiments, the motor 31 can be any suitable motor including a brushless motor or a brush motor.

The propeller 32 can comprise a seat 321 and a blade 322 fixed to the blade 322. The blade 322 can be a counterclockwise rotating blade. For instance, a rotation of the blade 322 in a counterclockwise direction can provide a propulsion to the UAV 100. In some embodiments, two blade 322 can be fixed to two sides of the seat 321 along a radial direction of the seat 321.

The seat 321 can be provided in a substantially cylindrical shape. A first alignment marker 321a can be provided on a top surface of the seat 321. A first locking block 321b can be provided on a side surface of the seat 321. In some embodiments, the first alignment marker 321a can be a circular hole. It will be appreciated that, the first alignment marker 321a can be provided as a marker of other forms. For example, the first alignment marker 321a can be provided as a triangular hole, a square hole, an oval hole, or a graphic symbol attached to the seat 321. In some embodiments, two first locking block 321b can be provided at opposite sides of the seat. Each of the two locking block 321b can be disposed on the side surface of the seat 321 between the blades 322. The first locking block 321b can protrude from the side surface of the seat 321 and extend a length along a circumference of the seat 321. The first locking block 321b can be positioned in proximity to a first blade 322 in the rotating direction of the propeller 32. A length of the first locking block 321b along the circumference of the seat 321 can be less than a circumferential length of the side surface of the seat 321 between the blades 322, such that a gap is formed between the first locking block 321b and a second blade 322 in a direction opposite to the rotating direction of the propeller 32. A first fitting surface 321c can be formed on a side of the first locking block 321b which is distally from the motor 31. The first fitting surface 321c can be an inclined surface which is inclined at an angle with respect to an axis of rotation of the propeller 32, such that an end of the first fitting surface 321c distal from the axis of rotation of the propeller 32 is closer to the top surface of the seat 321.

Figure 3:
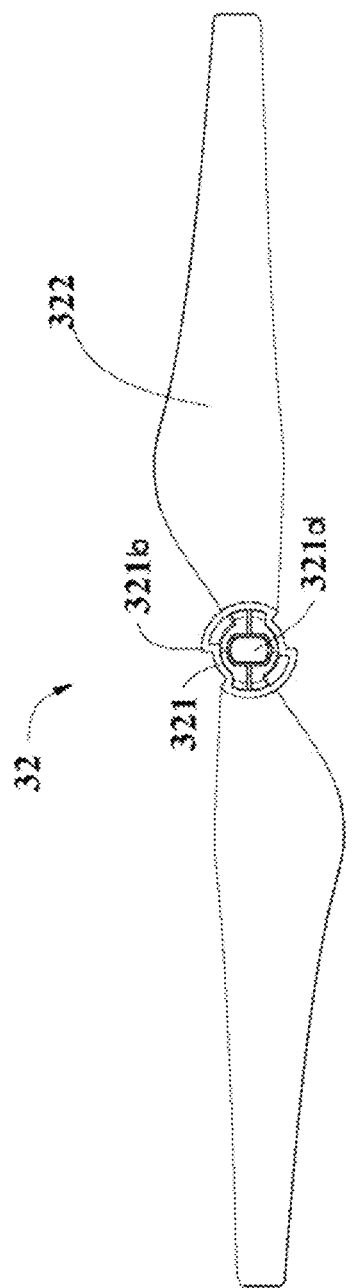
FIG. 3 is a bottom view of a propeller of the rotor assembly of FIG. 2.
Figure 4:
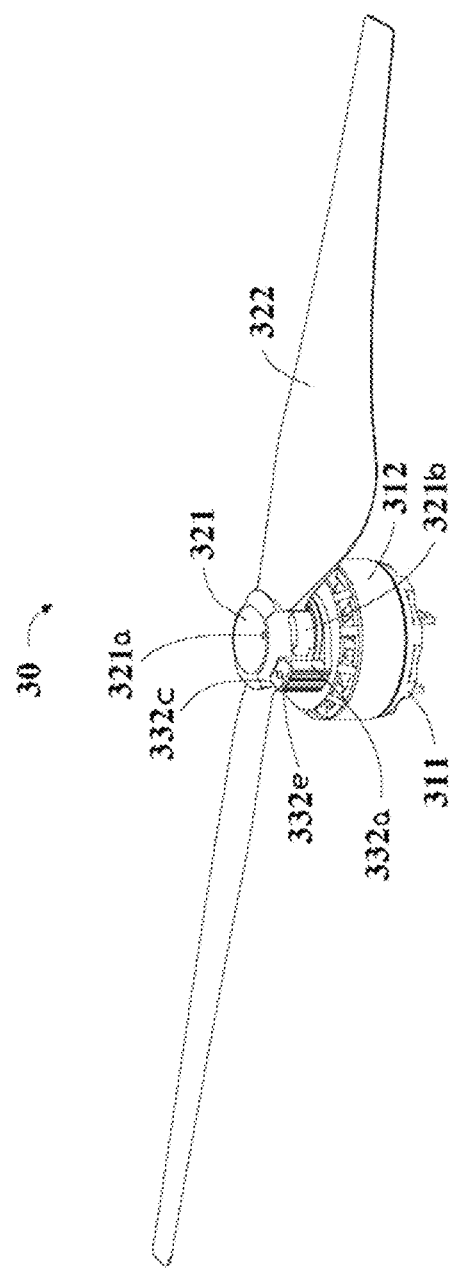
FIG. 4 shows the assembled rotor assembly of FIG. 2 where the propeller being in an unlocked state.

Referring to FIG. 3, a mounting hole 321d can be provided on a side of the seat 321 facing the motor 31. In some embodiments, the mounting hole 321d can be a substantially slotted hole. It will be appreciated that, a cross section of the mounting hole 321d can be provided with other shapes including an oval shape or a polygonal shape.

The connection assembly 33 can comprise a restrainer 331, a locking member 332 and an elastic member 333. The locking member 332 can be positioned between the restrainer 331 and the elastic member 333. The elastic member 333 can be positioned between the locking member 332 and the motor 31.

The restrainer 331 can comprise a restraining flange 331a and a boss 331b connected to the restraining flange 331a. In some embodiments, an extending direction of the boss 331b can be substantially perpendicular to an extending direction of the restraining flange 331a. The restraining flange 331a can be a substantially rectangular plate. Alternatively, the restraining flange 331a can be provided with other shapes. A plurality of through-holes 331c can be provided on the restraining flange 331a. The through-holes 331c can correspond to at least a subset of the connecting holes 312e. In some embodiments, two through-holes 331c can be provided which correspond to two connecting holes 312e. A shape of the boss 331b can match a shape of the mounting hole 321d, such that the propeller 32 does not rotate relative to the restrainer 331 once the boss 331b is fitted into the mounting hole 321d. A side of the boss 331b facing the motor 31 can be provided with a recess (not shown) which engages with the rotating shaft 321a.

The locking member 332 can comprise a latch 332a which corresponds to the first locking block 321b and a connecting portion 332b which is connected to the latch 332a. The latch 332a can protrude from a side of the connecting portion 332b. A second locking block 332c matching with the first locking block 321b can be formed at a distal end of the latch 332a. The second locking block 332c can protrude toward an axis of rotation of the motor 31. A second fitting surface 332d matching the first fitting surface 321c can be formed on a side of the second locking block 332c facing the motor 31. A direction of inclination and an angle of inclination of the second fitting surface 332d with respect to the axis of rotation of the propeller 32 can be identical to a direction of inclination and an angle of inclination of the first fitting surface 321c with respect to the axis of rotation of the propeller 32. A height of the second fitting surface 332d with respect to a surface of the connecting portion 332b can be substantially identical to a height of the first locking block 321b along the axis of rotation of the propeller 32. In some instances, the height of the second fitting surface 332d with respect to the surface of the connecting portion 332b can be slightly larger than the height of the first locking block 321b along the axis of rotation of the propeller 32.

A second alignment marker 332e corresponding to the first alignment marker 321a can be provided on an end surface of the latch 332a distal from the connecting portion 332b. In some embodiments, the second alignment marker 332e can be a circular hole. It will be appreciated that, the second alignment marker 332e can be provided as a marker of other forms. For example, the second alignment marker 332e can be provided as a triangular hole, a square hole, an oval hole, or a graphic symbol attached to the latch 332a. The second alignment marker 332e can be identical to or different from the first alignment marker 321a.

Figure 5:
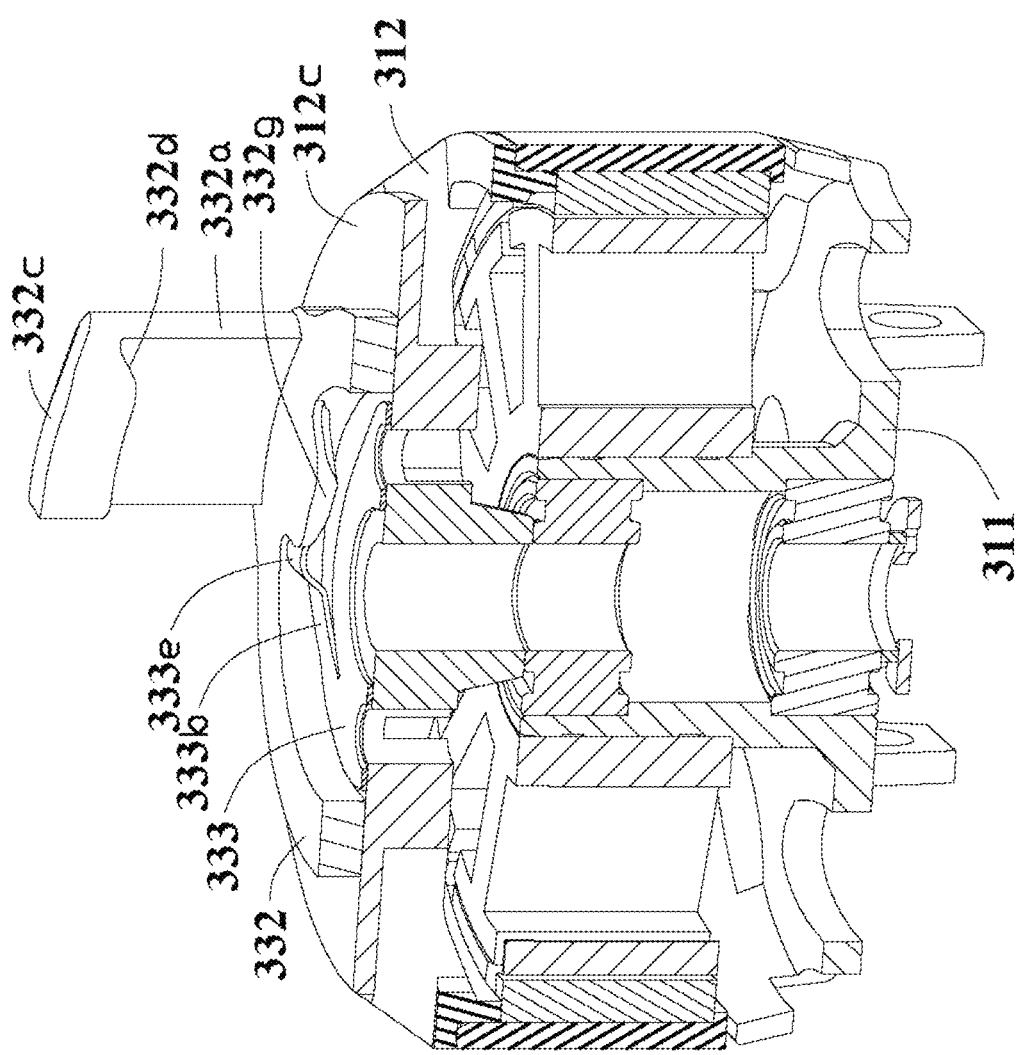
FIG. 5 is a cross-sectional view showing a part of the rotor assembly of FIG. 4.
Figure 6:
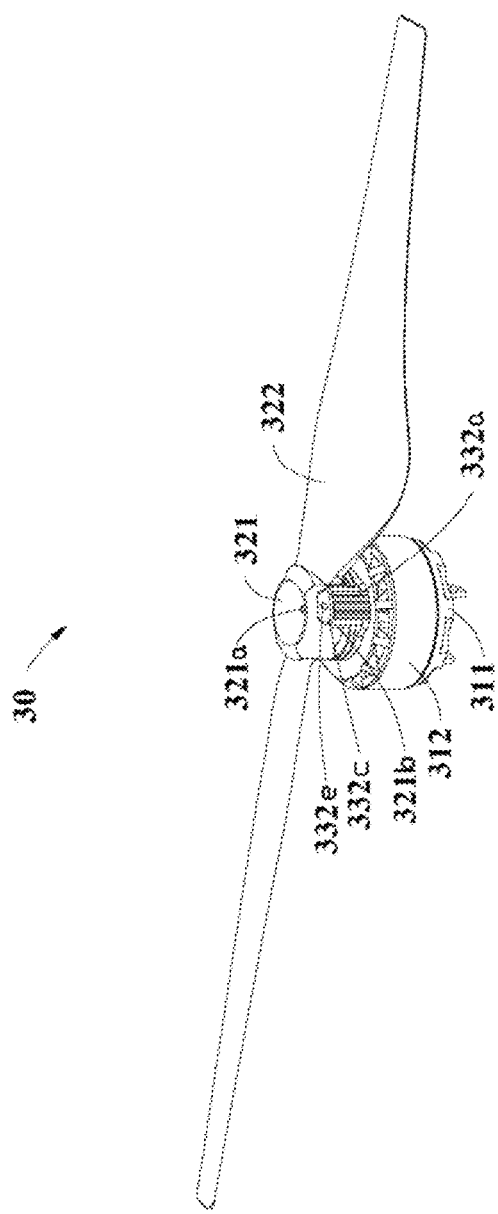
FIG. 6 shows the rotor assembly of FIG. 4 in a locked state.
Figure 7:
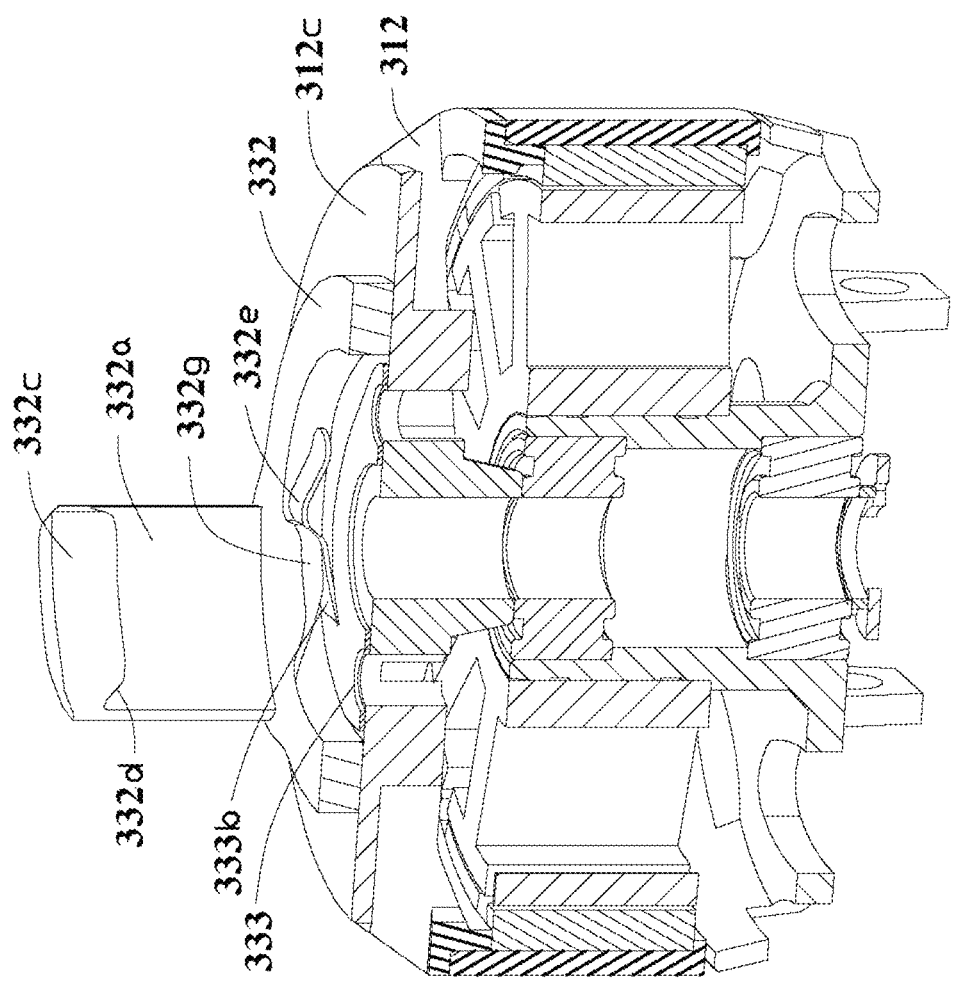
FIG. 7 is a cross-sectional view showing a part of the rotor assembly of FIG. 6.

The connecting portion 332b can be provided with a substantially annular shape. An abutting piece 332f can protrude from an inner surface of the connecting portion 332b. In some embodiments, two abutting piece 332f can be provided. It will be appreciated that, the number of the abutting piece 332f can vary in different circumstances. A bulge 332g (refer to FIGS. 5 and 7) can be formed on a side of the abutting piece 332f facing the motor 31. Both sides of the bulge 332g can be a smoothly curved surface.

It will be appreciated that, the bulge 332g can be formed directly on a side of the connecting portion 332b facing the motor 31, in which cases the abutting piece 332f can be omitted.

The elastic member 333 can be provided as a substantial sheet like member. The elastic member 333 can comprise a connecting portion 333a and an elastic tab 333b corresponding to the abutting piece 332f. The connecting portion 333a can be provided with a shaft hole 333c and a through-hole 333d corresponding to at least a subset of the connecting holes 312e. In some embodiments, two through-holes 333d can be provided which correspond to two connecting holes 312e. The elastic tab 333b can protrude toward the locking member 332 with respect to a surface of the connecting portion 333a. The elastic tab 333b can be bent at a substantially middle position thereof to form a protrusion 333e which protrudes toward the locking member 332. Both sides of the protrusion 333e can be a smoothly curved surface. In some embodiments, the elastic tab 333b can be formed integrally with the connecting portion 333a.

Referring to FIGS. 2 to 7, in assembling the rotor assembly, the elastic member 333, the locking member 332 and the restrainer 331 can be stacked on the connecting surface 312c of the motor 31 in this order. The through-holes 331c of the restrainer 331 can be aligned with the corresponding through-holes 333d of the elastic member 333 and the connecting holes 312e.

The rotating shaft 312a can pass through the shaft hole 333c of the elastic member 333 and the locking member 332 and then be inserted into the recess of the restrainer 331. The restrainer 331 and the elastic member 333 can be fixed to the connecting surface 312c. In some embodiments, the restrainer 331 and the elastic member 333 can be fixed to the connecting surface 312c by a bolt 334. The bolt 334 can pass through the through-hole 331c and the through-hole 333d and engage into the corresponding connecting hole 312e. The locking member 332 can be restrained between the restrainer 331 and the connecting surface 312c. The locking member 332 can be rotatable relative to the restrainer 331 and the rotator 312 about an axis of rotation of the rotating shaft 312a. The locking member 332 can elastically abut against the elastic member 333 if being rotated. The propeller 32 can be coupled to the restrainer 331. The boss 331b can be inserted into the mounting hole 321d of the propeller 32. The gap between the first locking block 321b corresponding to the latch 332a and the second blade 322 opposite to the rotating direction of the propeller 32 extends toward a top of the propeller 32 along the axis of rotation of the propeller 32.

Upon completion of the above assembling processes, the propeller 32 of the rotor assembly 30 can be in an unlocked state. The propeller 32 can be locked by rotating the locking member 332 with respect to the propeller 32 along the rotating direction of the rotor assembly 30 to engage the second locking block 332c of the latch 332a with the first locking block 321b. In some instances, the first fitting surface 321c can be aligned with and fitted with the second fitting surface 332d. A firm locking between the first fitting surface 321c and the second fitting surface 332d can be effected because both the first fitting surface 321c and the second fitting surface 332d incline with respect to the axis of rotation of the propeller 32 with the same direction of inclination and angle of inclination. During the rotation of the locking member 332, the locking member 332 can elastically abut against the elastic member 333. In some instances, the bulge 332g of the locking member 332 can be positioned at one side of the protrusion 333e of the elastic member 333 when the propeller 32 is unlocked. The bulge 332g can slide along the protrusion 333e and force the protrusion 333e to deform toward the motor 31 during the rotation of the locking member 332. The bulge 332g can slide to the other side of the protrusion 333e when the propeller 32 is locked. A smooth sliding of the locking member 332 can be effected with a clear feedback because both sides of the bulge 332g and the protrusion 333e are smoothly curved surfaces. When the propeller 32 is locked, the protrusion 333e can exert an elastic force onto the locking member 332 to maintain a tight locking of the locking member, thereby ensuring a robust locking.

In locking the propeller 32, a determination on whether the propeller 32 is firmly locked can be made from a relative position of the first alignment marker 321a with respect to the second alignment member 332e, so as to prevent a failure in locking due to an insufficient rotation. In some embodiments, the propeller 32 can be firmly locked if the first alignment marker 321a and the second alignment marker 332e are aligned along a radial direction of the propeller 32.

Figure 8:
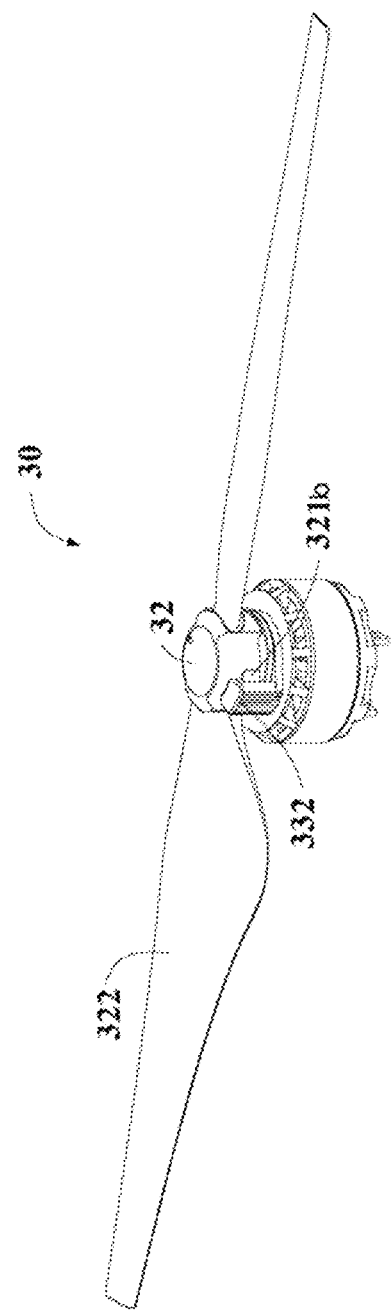
FIG. 8 shows a rotor assembly of the UAV of FIG. 1 which rotates in another rotating direction, where the propeller being in a locked state.

FIG. 8 shows a rotor assembly 30 of the UAV 100 which rotates in a clockwise rotating direction. A structure of the rotor assembly 30 which rotates in a clockwise rotating can be substantially identical to that of the rotor assembly 30 which rotates in a counterclockwise rotating direction as described hereinabove. As shown in FIG. 8, the first locking block 321b can be positioned in proximity to one of the blades 322 in the clockwise rotating direction. The propeller 32 can be locked by rotating the locking member 332 with respect to the propeller 32 along the clockwise rotating direction.

In the rotor assembly as discussed herein above and a UAV having the rotor assembly, the propeller can be locked by rotating the locking member with respect to the rotator and the propeller. A mechanism of rotating the propeller can be separate from a mechanism of locking the propeller. Therefore, a torque generated in locking the propeller by the locking member is not transmitted to the propeller, such that a wear and tear of the propeller can be reduced and a safety in using the rotor assembly can be ensured. In addition, a locking and unlocking of the propeller is simple and convenient.

Furthermore, the propeller can be a self-tightening propeller because the propeller is locked by rotating the locking member with respect to the rotator and the propeller along the rotating direction of the rotor assembly, thereby a reliability in locking the propeller is improved.

It will be appreciated that numerous variations and substitutions will occur to those skilled in the art without departing from the scope of the disclosure. Those variations and substitutions made in accordance with the spirit of the disclosure are within the scope of the present disclosure.

What is claimed is:

1. A rotor assembly, comprising:
a propeller;
a motor including a stator and a rotator rotatable with respect to the stator, and configured to drive the propeller to rotate through the rotator; and
a connection assembly arranged between the propeller and the motor, and including a locking member and an elastic member, the elastic member being configured to provide a force onto the locking member in response to the propeller being locked to the motor by the locking member, to maintain a locking state of the locking member.

2. The rotor assembly of claim 1, wherein the rotator includes a rotating shaft, the rotating shaft passing through an accommodation space defined by the locking member and an accommodation space defined by the elastic member.

3. The rotor assembly of claim 2, wherein the connection assembly further includes a restrainer, and the rotating shaft passes through an accommodation space defined by the restrainer.

4. The rotor assembly of claim 3, wherein the restrainer and the elastic member are coaxially arranged.

5. The rotor assembly of claim 3, wherein the restrainer or the elastic member includes a through hole for the rotating shaft to pass through.

6. The rotor assembly of claim 3, wherein the rotating shaft passes through the accommodation space defined by the elastic member, the accommodation space defined by the restrainer, and the accommodation space defined by the locking member, successively.

7. The rotor assembly of claim 1, wherein the rotator includes a housing and a rotating shaft, and the locking member is configured to rotate with respect to the housing of the rotator to lock the propeller to the motor.

8. The rotor assembly of claim 7, wherein the housing includes a connecting surface facing the propeller, the elastic member being in contact with the connecting surface.

9. The rotor assembly of claim 8, wherein the rotating shaft protrudes toward the propeller from the connecting surface by a predetermined distance.

10. The rotor assembly of claim 1, wherein the elastic member is configured to provide a longitudinal force onto the locking member in response to the propeller being locked to the motor by the locking member.

11. The rotor assembly of claim 1, wherein:
the locking member includes a first locking unit;
the propeller includes a second locking unit matching the first locking unit; and the first locking unit is coupled to the second locking unit in response to the propeller being locked to the motor.

12. The rotor assembly of claim 1, further comprising:
a first alignment marker provided at a rotating side of the rotor assembly during a locking process;
a second alignment marker provided at a non-rotating side of the rotor assembly during the locking process, the first alignment marker and the second alignment marker being configured to align along a radial direction of the propeller in response to the propeller being locked to the locking member.

13. An aerial vehicle comprising:
one or more rotor assemblies each including:
   a propeller;
   a motor including a stator and a rotor rotatable with respect to the stator, and configured to drive the propeller to rotate through the rotator; and
   a connection assembly arranged between the propeller and the motor, and including a locking member and an elastic member, the elastic member being configured to provide a force onto the locking member in response to the propeller being locked to the motor by the locking member, to maintain a locking state of the locking member.

14. The aerial vehicle of claim 13, wherein the rotator includes a rotating shaft, the rotating shaft passing through an accommodation space defined by the locking member and an accommodation space defined by the elastic member.

15. The aerial vehicle of claim 14, wherein the connection assembly further includes a restrainer, and the restrainer or the elastic member includes a through hole for the rotating shaft to pass through.

16. The aerial vehicle of claim 14, wherein the connection assembly further includes a restrainer, and the rotating shaft passes through the accommodation space defined by the elastic member, an accommodation space defined by the restrainer, and the accommodation space defined by the locking member, successively.

17. The aerial vehicle of claim 13, wherein the rotator includes a housing and a rotating shaft, and the locking member is configured to rotate with respect to the housing of the rotator to lock the propeller to the motor.

18. The aerial vehicle of claim 13, wherein:
the rotator includes a housing and a rotating shaft;
the housing includes a connecting surface facing the propeller, the elastic member being in contact with the connecting surface; and
the rotating shaft protrudes toward the propeller from the connecting surface by a predetermined distance.

19. The aerial vehicle of claim 13, wherein:
the locking member includes a first locking unit;
the propeller includes a second locking unit matching the first locking unit; and
the first locking unit is coupled to the second locking unit in response to the propeller being locked to the motor.

20. The aerial vehicle of claim 13, wherein each of the one or more rotor assemblies further includes:
a first alignment marker provided at a rotating side of the each of the one or more rotor assemblies during a locking process;
a second alignment marker provided at a non-rotating side of the each of the one or more rotor assemblies during the locking process, the first alignment marker and the second alignment marker being configured to align along a radial direction of the propeller in response to the propeller being locked to the locking member.

\* \* \* \* \*